Sept. 20, 1971   K. J. VON FORELL   3,605,815
PRESSURE ACCUMULATOR
Filed Nov. 12, 1969
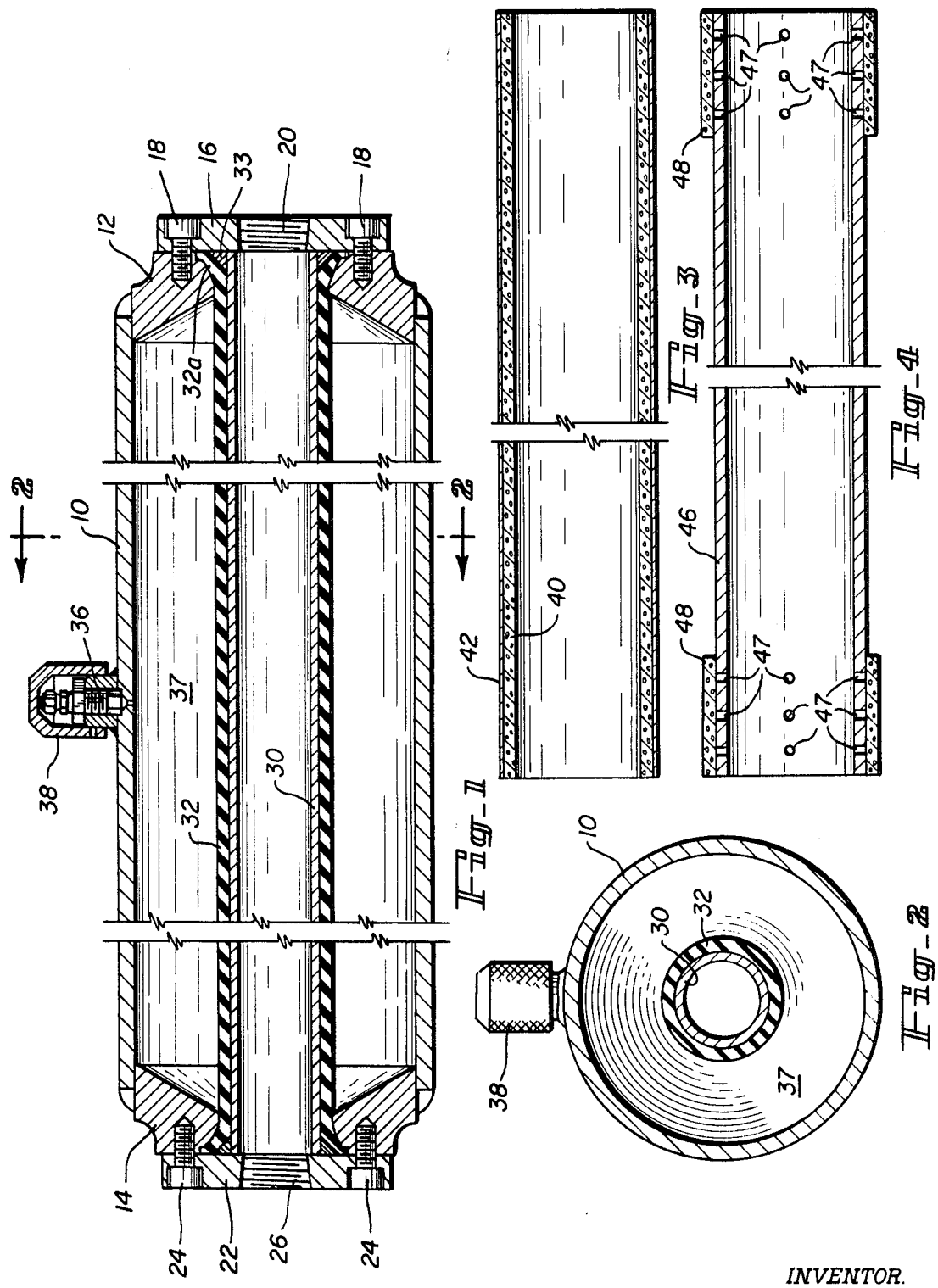
INVENTOR.
KENNETH VON FORELL
BY
Richard D. Law
ATTORNEY United States Patent Office 3,605,815
Patented Sept. 20, 1971

3,605,815
PRESSURE ACCUMULATOR
Kenneth J. Von Forell, P.O. Box 2176, Industrial Park,
Fort Collins, Colo. 80521
Filed Nov. 12, 1969, Ser. No. 875,731
Int. Cl. F16l 55/04
U.S. Cl. 138—30                                        1 Claim

ABSTRACT OF THE DISCLOSURE

A gas pressure charged, tubular diaphragm, pressure accumulator having a flow tube formed of sintered metal providing communication passages for the tubular diaphragm and a liquid under pressure in the flow tube, so that the gas absorbs sudden surges of flow and pressure in the liquid flow line. The sintered metal flow tube in the accumulator provides full open communication between the liquid and the diaphragm but prevents extruding of the diaphragm material through the openings at high gas pressures and low liquid pressures.

---

Pressure accumulators provide a gas chamber under pressure sealed from a liquid system under pressure by a flexible diaphragm, whereby the gas under pressure absorbs pressure surges in the liquid. Liquid streams in closed systems are particularly subject to surges of pressure including that produced from motion of the liquid or due to stopping motion of the liquid. Generally, a liquid is essentially incompressible, and a pressure applied at one point is more or less transmitted throughout the liquid. Various types of surge absorbing chambers have been utilized in the prior art, and most are of a gas chamber type which uses compressible gas to absorb the pressure changes in the liquid system.

For high pressure liquid systems, a diaphragm-type accumulator is used, with a flexible diaphragm separating a gas chamber, which is under gas pressure, from the liquid system. The structure provides open communication between the liquid system and one side of the barrier diaphragm. The gas chamber is normally charged with a gas to a pressure which exceeds the normal working pressure of the liquid system. A major problem occurring in high pressure systems, which causes disruptive damage to the diaphragm, is the extrusion of the diaphragm material through openings in the diaphragm support. These openings provide open communication between one side of the diaphragm with the liquid system. As pointed out above, the gas chamber is under a pressure which is normally higher than the working pressure of the liquid, and when the pressure on the liquid side is substantially reduced, the diaphragm is pressed against its support and the material of the diaphragm may be extruded through the openings in the diaphragm support next to the liquid system. To prevent the extrusion, various types of barriers have been proposed between the flexible diaphragm and the liquid system, and these include perforated plates, screen material, woven wire, and the like. In each case, however, and in particular in high pressure hydraulic systems, substantially lowering the pressure of the hydraulic system, and especially when the system drops to 0 pressure, as due to a broken hydraulic line or the like, the high pressure of the gas in the gas chamber above the diaphragm extrudes the diaphragm material into the openings in the diaphragm support barrier. For efficient operation of the accumulator, the amount of orifice space in the barrier between the liquid and the diaphragm must be greater than the flow area in the liquid system, and heretofore no material has been available with openings sufficiently small to prevent the extrusion of the material and still provide the large liquid flow-through area necessary for effective operation of the accumulator.

According to the present invention, I have provided an accumulator which utilizes a sintered metal barrier between a diaphragm and a liquid system. The sintered metal provides a substantially greater volume of liquid through-put area than the flow system, but still provides openings small enough to prevent extrusion of the diaphragm material through the supporting barrier.

It is, therefore, among the objects and advantages of the present invention to provide a simplified, highly efficient accumulator particularly for high pressure liquid systems.

Another object of the invention is to provide a sintered metal support barrier for a diaphragm in an accumulator for high pressure liquid system.

A further object of the invention is to provide an effective accumulator for high pressure fluid lines, which is easily installed in the line and provides an effective capacity for high pressure fluid lines.

These and other objects and advantages of the invention may be readily ascertained by referring to the following description and appended illustrations in which:

FIG. 1 is a cross-section, side elevational view of an inline accumulator for high pressure liquid systems;

FIG. 2 is an end elevational view in cross-section taken along section line 2—2;

FIG. 3 is a cross-section, side elevational view of a diaphragm support barrier according to the invention; and FIG. 4 is a side elevational view in cross-section of a modified form of diaphragm support barrier according to the invention.

One form of an accumulator for liquid systems is called an inline accumulator, wherein a perforated flow tube is mounted in the line of a flowing liquid system, and a sleeve of flexible diaphragm is placed over the perforated tube section. A chamber is then placed over the flexible diaphragm in a sealed relation so that the volume outside the flexible diaphragm may be charged with a gas under a pressure. The gas chamber pressure is greater than the normal maximum pressure of the system. In another type of accumulator, a side arm is placed on a flow tube of a liquid system, and a flexible diaphragm support barrier is placed across the side arm. The flexible diaphragm is placed on the outside of a support barrier, and a gas chamber is placed around the diaphragm so that on charging the gas chamber the diaphragm is pressed against the support barrier. The support barrier must be made perforate to permit the flow of liquid therethrough against the diaphragm compressing the gas in the gas chamber and absorbing the pressure surges in the liquid system.

The accumulator selected for illustration is an inline accumulator, and it includes a tubular body 10 having an end seal 12 at one end and an end seal 14 at the opposite end. The seals 12 and 14 reduce the size of the tubular body 10 and provide means for a pipe connection at each end, for example end 16, which is secured by means of cap screws 18 to the end 12, provides a threaded opening 20 for connection to a pipe. On the opposite end, an end fitting 22, held to the end 14 by means of cap screws 24, provides a threaded connection 26 for the piping system of a liquid pressure system. A sintered metal flow tube 30 is mounted internally of the body 10, generally abutting the ends 16 and 22 and held securely in position therein. A sleeve-type flexible diaphragm 32 is mounted on the outside of the flow tube 30, and its ends are sealed between the end of the tubular body and the end fitting attached thereto. As shown in FIG. 1, the end 32a of the sleeve 32 is sealed between the flow tube 30, the end member 12, end fitting 16 and a seal ring 33. The seal ring 33 is pulled down tight against the sleeve end as the end member 16 is pulled down by means of the cap screws. In a similar manner, the opposite end is sealed. A gas charging valve 36, provided with a cover 38, provides means for introducing gas into chamber 37 inside of the body 10 and outside the diaphragm 32.

The sintered metal tube may be made of any metal which is compatible with the liquid of the system, and generally may be made from powdered stainless steel, Monel metal, etc., providing a flow tube which does not deteriorate under the action of the liquid in the system. The sintered metal may be made from a size of powdered metal to form passages through the flow tube which has an effective cross-section greater than the diameter of the flow tube. This provides free communication between the liquid and the diaphragm. In a modification, the flow tube may be made of large particles of the metal, heated and pressed together in a tubular shape and a thin layer of sintered, finer metal particles placed on the outside of the sintered metal tube, to reduce the size of the openings on the surface.

The thickness of the wall of the sintered tube should be sufficient to support the flexible diaphragm under the pressure of the gas in the gas chamber 37 in the absence of any pressure in the flow tube. The preferred circular configuration of sintered metal flow tubes provides an adequate means for supporting the sleeve diaphragm. Furthermore, as the length of the accumulator increases the particle size of the sintered material may be decreased, as the liquid through-put capacity for the sintered tube increases. The capacity of the accumulator is readily increased by increasing its length, maintaining the same diameter.

As shown in FIG. 3, a modified flow tube formed of a sintered metal tubular material 40 has an outer layer 42 of sintered metal of finer metal particles which permits adequate flow-through of liquid for effective operation of the accumulator. The larger sintered metal particles provides a tube of adequate strength at less cost for the flow tube which is satisfactory under high pressure conditions.

The modified flow tube shown in FIG. 4 includes a high pressure tube 46 having a plurality of holes 47 formed through the tube, and a sintered metal sleeve 48 telescoped over the outside of the tube 46 covering the holes 47. A sufficient number of holes should be bored through the flow tube to provide a cross-sectional area of the combined holes which is equal to or greater than the cross-sectional area of the tube 46. This configuration provides a very inexpensive flow tube for an accumulator since the sintered metal is more expensive than a solid tube. Furthermore, it provides means for utilizing high pressure tubing or pipe in the accumulator, providing strength for a very high pressure system. The tube 46 provides adequate support strength for a thin sintered metal sleeve 48, and the sintered metal prevents extrusion of the diaphragm into the drilled orifices 47 in the tube.

In the case of a side arm accumulator, a sintered metal plate placed across the side arm provides an adequate barrier for a cup or a disc type accumulator diaphragm depending upon the particular configuration of the diaphragm. It is, again, preferable to have the through-put passages of the sintered supporting barrier of a greater capacity than the cross-sectional area of the flow tube on which the accumulator is mounted, to thereby permit the compressed gas to absorb surges of pressure passing through the liquid in the system.

I claim:
1. In an in-line tubular accumulator for a liquid system under pressure having a tubular, flexible diaphragm communicating on one side with the liquid in said liquid system and on the other side with an annular pressurized gas chamber, the improvement of an elongated perforate support tube for said tubular, flexible diaphragm on the liquid side thereof preventing extension of said diaphragm into said liquid system, comprising said perforate support tube having a body formed of one size of sintered metal particles with a thin sleeve covering thereover formed of smaller size sintered metal particles providing a barrier for said diaphragm, said sleeve being characterized by having sufficient openings therethrough to at least equal to the flow passage through said liquid system and having a pore size sufficiently small as to prevent extrusion of the material of said diaphragm through said sleeve under conditions of high pressure gas in said annular gas chamber and the absence of liquid pressure in said system.

References Cited
UNITED STATES PATENTS

| | | | |
|---|---|---|---|
| 2,351,761 | 6/1944 | Hanna | 138—30 |
| 2,630,834 | 3/1953 | Weber et al. | 138—30 |
| 2,851,059 | 9/1958 | Lucien | 138—30 |
| 3,063,470 | 11/1962 | Forster | 138—30 |
| 3,195,577 | 7/1965 | Greer | 138—30 |
| 3,322,154 | 5/1967 | Mercier | 138—30 |

LAVERNE D. GEIGER, Primary Examiner

R. J. SHER, Assistant Examiner